(12) United States Patent
Summerer

(10) Patent No.: US 9,348,575 B2
(45) Date of Patent: May 24, 2016

(54) UPDATE OF A DATA-CARRIER APPLICATION

(75) Inventor: Alexander Summerer, Poing (DE)

(73) Assignee: Giesecke & Devrient GMBH, Munich (DE)

( * ) Notice: Subject to any disclaimer, the term of this patent is extended or adjusted under 35 U.S.C. 154(b) by 47 days.

(21) Appl. No.: 14/008,915

(22) PCT Filed: Mar. 29, 2012

(86) PCT No.: PCT/EP2012/001398
§ 371 (c)(1),
(2), (4) Date: Sep. 30, 2013

(87) PCT Pub. No.: WO2012/130461
PCT Pub. Date: Apr. 10, 2012

(65) Prior Publication Data
US 2014/0019955 A1    Jan. 16, 2014

(30) Foreign Application Priority Data

Mar. 31, 2011  (DE) .............................. 102011015711

(51) Int. Cl.
| | |
|---|---|
| *G06F 21/00* | (2013.01) |
| *G06F 15/16* | (2006.01) |
| *G06F 9/445* | (2006.01) |
| *G06F 21/57* | (2013.01) |
| *H04W 4/00* | (2009.01) |
| *H04L 29/06* | (2006.01) |

(52) U.S. Cl.
CPC  *G06F 8/65* (2013.01); *G06F 21/57* (2013.01); *H04W 4/001* (2013.01); *H04W 4/003* (2013.01); *H04L 63/123* (2013.01)

(58) Field of Classification Search
CPC ........... G06F 11/30; G06F 9/46; G06F 21/00; G06F 15/16
See application file for complete search history.

(56) References Cited

U.S. PATENT DOCUMENTS

2004/0268142 A1 * 12/2004 Karjala et al. ................ 713/200
2005/0207562 A1    9/2005 Nachef et al.
(Continued)

FOREIGN PATENT DOCUMENTS

EP    1361527 A1 * 11/2003
EP    2106191 A1    9/2009

OTHER PUBLICATIONS

International Search Report from corresponding PCT Application No. PCT/EP2012/001398, Jan. 3, 2013.
(Continued)

*Primary Examiner* — Chat Do
*Assistant Examiner* — Devayani R Talukdar
(74) *Attorney, Agent, or Firm* — Workman Nydegger

(57) ABSTRACT

In a method for updating or installing a data storage medium application which can be executed on a secure data storage medium, the data storage medium is used in a telecommunications terminal. Updating data for the data storage medium application are first integrated into a terminal application certificate of a terminal application to be installed on the telecommunications terminal. Next the terminal application is installed in the telecommunications terminal and the data storage medium application in the data storage medium is configured according to the updating data. The terminal application certificate functions as a data container for the transparent updating data to be forwarded to the data storage medium. The updating data may relate to access rights of the terminal application to a data storage medium application already installed in the data storage medium or to a data storage medium application to be newly installed in the data storage medium.

14 Claims, 5 Drawing Sheets

(56) References Cited

U.S. PATENT DOCUMENTS

| | | | | |
|---|---|---|---|---|
| 2006/0080534 | A1* | 4/2006 | Yeap et al. | 713/176 |
| 2008/0098221 | A1* | 4/2008 | Hashimoto et al. | 713/169 |
| 2012/0124563 | A1* | 5/2012 | Chung et al. | 717/140 |
| 2012/0159578 | A1* | 6/2012 | Chawla et al. | 726/4 |
| 2013/0340048 | A1* | 12/2013 | Sebastian et al. | 726/4 |
| 2014/0181505 | A1* | 6/2014 | Moore et al. | 713/156 |
| 2014/0298420 | A1* | 10/2014 | Barton et al. | 726/4 |

OTHER PUBLICATIONS

"Series X: Data Networks, Open System Communications and Security—Directory; Information Technology—Open Systems Interconnection—The Directory: Public-key and Attribute Certificate Frameworks", ITU-T Standard X.509, International Telecommunication Union, Nov. 2008.

"3rd Generation Partnership Project; Technical Specification Group Core Network and Terminals; Security Mechanisms for the (U) SIM Application Toolkit; Stage 2 (Release 5)", 3GPP Standard; 3GPP TS 23.048, 3rd Generation Project Partnership Project (3GPP), Mobile Competence Centre; No. V5.9.0, pp. 1-37, Jun. 1, 2005.

"3rd Generation Partnership Project; Technical Specification Group Services and System Aspects; Feasibility Study on the Security Aspects of Remote Provisioning and Change of Subscription for Machine to Machine (M2M) Equipment (Release 9)", 3GPP Standard; 3GPP TR 33.812, 3rd Generation Partnership Project (3GPP), Mobile Competence Centre; No. V9.2.0, pp. 1-87, Jun. 22, 2010.

* cited by examiner

FIG 1

|   |   |   |   |
|---|---|---|---|
| ( | S1 | AplProv | install Apl4 ) |
|   | S2 | AplProv | write UpdtDat |
|   | S3 | AplProv | sign AppCert3 |
|   | S4 | AplProv | deploy App3 |
|   | S5 |  | install App3 |
|   | S6 |  | start App3 |
|   | S7 | App3 | access Apl4 |
|   | S8 | API/SecApl | verify AppCert3 |
|   | S9 | API | transmit UpdtDat to SecApl |
|   | S10 | SecApl | update CL |
|   | S11 | SecApl | grant access |
|   |   |   |   |
|   | S10a | SecApl | update CL, AC |
|   | S10b | SecApl | decode Apl4 from UpdtDat |
|   | S10c | SecApl | transmit Apl4 to API |
|   | S10d | API | transmit Apl4 to SDCMngr |
|   | S10e | SDCMngr | install Apl4 |

FIG 5

X509 Certificate

Version: 3
    SerialNumber: 1287080631032
    IssuerDN: CN=issuername,OU=issuerunit,O=GuD,L=Munich,ST=BY,C=GER
    Start Date: Thu Oct 14 18:23:51 CEST 2010
    Final Date: Wed Oct 14 18:23:51 CEST 2015
    SubjectDN: CN=ownername,OU=ownerunit,O=GuD,L=Munich,ST=BY,C=GER
    Public Key: RSA Public Key
      modulus:
b65f5eacf75716023af5ae0f273b5d26ee9a2975cb95ae8b9ed016029786abda37713187dcf30a64fefab2113c72776
f9ef663c1ba0b30d5a2ea1b72a154bfe90b7c9edc25aef3464cd66c25f8f3ac31c284f3beee60da331bdb37169fa226a
34dd35ba5398152c2c95030ec35f6d52d7385557b61c9ce0e6cfccd2d81ed2e1b
    public exponent: 10001

Signature Algorithm: SHA1withRSA
      Signature: 69c82895bd3e7b0fa188f9be8e89c56dcb1e9607
        16d8cc2a472d2ff7c8c8d61ae4b00817d6b02cfc
        cf100d2a29f6a2a0588881d04b4e062446b10333
        c07bc416766d2cfc287b38ae8c75f297ba704637
        dd6bc0cc162c6d16f8e3e9958cd9980ec72f1c98
        22b331a5f722576c85895d149f7304d271947c4b
        74e81e8ec8422028
    Extensions:
      Extension Applet (OID: 2.5.4.6)
        critical(false)
        Value:
          appletAid: A0 00 00 00 03 00 00 00
          encSecureChannelKeySet: 11 23 15 21 57 13 98 24 53 57 10 24 62 14 41 52
          appletData:
           PackageLoadParameters:
            DAPBlockParameter: <SD_AID>, <enc_DAP_KeySet>
            DAPBlockParameter: <SD_AID>, <enc_DAP_KeySet>
            DAPBlockParameter: <SD_AID>, <enc_DAP_KeySet>
            CapFile: <JavaCard CAP File>
            CapFileLoadOptions: Descriptor, Debug
            SecurityDomainAid: A0 00 00 00 03 00 02 20
            DelegatedManagementSecurityDomainAid: A0 00 00 00 03 00 02 20
            EncLoadTokenKeySet: 11 23 15 21 57 13 98 24 53 57 10 24 62 14 41 52
          AppletInstallParameters:
            PackageAid: A0 00 00 00 03 00 00 00
            AppletClassAid: A0 00 00 00 03 00 00 00
            AppletInstanceAid: A0 00 00 00 03 00 00 00
            DelegatedManagementSecurityDomainAid: A0 00 00 00 03 00 02 20
            encInstallTokenKeySet: 11 23 15 21 57 13 98 24 53 57 10 24 62 14 41 52
      Extension APCertificate (OID: 2.5.4.7)
        critical(false)
        Value:
          Aid: A0 00 00 00 03 00 00 00
          APCertificate: <DER Coded X.509 Certificate>
      Extension ACLEntries (OID: 2.5.4.8)
        critical(false)
        Value:
          Aid: A0 00 00 00 03 00 00 00
            ACLEntry:
              ApkHash: 14 36 36 58 29 74 12 10 53 58 14 36 36 58 29 74 12 10 53 58
              Acl: 00 A4 04 00 00 FF FF FF FF 00 E4 00 00 00 FF FF FF FF
            ACLEntry:
              ApkHash: 12 49 12 53 34 47 34 24 57 13 12 49 12 53 34 47 34 24 57 13
              Acl: 00 E4 00 00 00 FF FF FF FF

UPDATE OF A DATA-CARRIER APPLICATION

BACKGROUND

The present invention relates to a method for updating a data carrier by updating or installing a data-carrier application executable on a data carrier that is inserted in a telecommunication end device, to such a data carrier, to such a telecommunication end device as well as to a digital certificate thereby employed.

SUMMARY

Nowadays, telecommunication end devices equipped with powerful processors and many kinds of applications—so-called smartphones—have become very popular. The telecommunication connection or mobile radio connection required therefor, and/or the secure memory space required for the diverse uses that frequently also process confidential data, is made available by secure data carriers which are insertable into the respective telecommunication end device, e.g. by (U)SIM mobile radio cards, smart cards, Secure Digital (SD) memory cards or the like. Such secure data carriers normally also comprise a processor and applications executable thereon. Two different kinds of applications can be distinguished here, namely, the end-device applications installed on the telecommunication end device—also referred to as "apps" with some smartphones—and the data-carrier applications executable on the data carrier—also referred to as "applets" with some data carriers.

While diverse uses are made available on the telecommunication end device with the end-device applications (e.g. apps), the data-carrier applications (e.g. applets) frequently relate to uses in connection with security aspects of the telecommunication end device, e.g. the telecommunication connection or mobile radio connection, the identity of a user, monetary transactions or other data that are confidential or worthy of protection. The data carriers thus have special security functionalities, in particular a secure memory.

End-device applications executed on the telecommunication end device frequently require access to data-carrier applications in the secure data carrier. To prevent abuse of the security-relevant functionalities of the data-carrier applications and of the confidential data stored there, one can provide e.g. an access rights management which allows an end-device application to access a data-carrier application only if it has corresponding access rights. However, such a mechanism relates only to the access rights of those end-device applications that were already known and could be taken into consideration upon the manufacture of the data carrier, e.g. upon its initialization or personalization. End-device applications that are later installed on a telecommunication end device are therefore not known to the access rights management and accordingly have no access to installed data-carrier applications. It is even more of a problem to access those data-carrier applications that have yet to be installed on the data carrier. Updating access rights later or actually installing new data-carrier applications later on an already delivered data carrier is undesirable, if not impossible, in this connection in particular for security reasons.

Because telecommunication end devices usually have only one data-carrier slot, it is also impossible to make changed access rights or new data-carrier applications available on a second secure data carrier. One might consider making available a replacement data carrier accordingly updated by the provider, but this is not especially advantageous because it would lose important user data that are impossible or difficult to procure again, e.g. digital certificates, licenses or rights.

In this connection, EP 1 361 527 A1 proposes updating the data stock of a delivered mobile radio card by means of a contactless data communication via an air or OTA (over-the-air) interface. However, other data carriers insertable into telecommunication end devices, e.g. SD cards or the like, frequently do not make available the technical infrastructure this requires. Furthermore, users of a secure data carrier with confidential user data would be shaken in their trust in the data security, because contactless data transfers frequently, and with reason, trigger fears about data security and data abuse.

It is therefore the object of the present invention to create a technically simple and sufficiently secure possibility for updating a secure data carrier inserted in a telecommunication end device, carried out through an update or installation of a (or several) data-carrier application(s) in the secure data carrier.

This object is achieved by a method and apparatuses having the features of the independent claims. In claims dependent thereon, advantageous embodiments and developments of the invention are stated.

In a method for updating or installing a data-carrier application executable on a secure data carrier, with the data carrier being inserted in a telecommunication end device, update data are integrated according to the invention into an end-device application certificate of an end-device application to be installed on the telecommunication end device, on the basis of which update data the relevant data-carrier application can then be configured. For this purpose, the end-device application is installed on the telecommunication end device and the update data are extracted from the end-device application certificate of the installed end-device application. Finally, the data-carrier application is configured in the data carrier according to the extracted update data in such a way that this data-carrier application is present in updated or newly installed form on the data carrier.

Upon the update of the data-carrier application, the data-carrier application itself can be (checked and as needed) changed, dependent on the type of update. In particular with an update in the shape of a configuration of the data-carrier application it can be the case that the data-carrier application itself is not changed, but that merely access rights between the data-carrier application and other data-carrier or end-device applications are (checked and as needed) changed.

According to an aspect of the present invention, an end-device application certificate is employed as a container data structure for the update data, by the update data being integrated in the end-device application certificate outside the telecommunication end device (and the data carrier) and being extracted within the telecommunication end device or the data carrier. According to a further aspect of the invention, the container structure employed for making available the update data within the telecommunication end device or the data carrier is brought into the telecommunication end device in the form of an end-device application certificate of an end-device application to be installed. According to yet a further aspect of the invention, the update data are brought into the telecommunication end device with exactly that end-device application that requires access to the data-carrier application whose update the update data relate to.

In connection with the present invention, a certificate is understood to be a digital data structure, by which an owner and, where applicable, further properties of a public key are confirmed, for example by a trustworthy certifying entity. The end-device application certificate confirms in this way the trustworthiness of the public key of the provider of the relevant end-device application that comprises the end-device application certificate. The same applies to the data-carrier application certificate mentioned below, which comprises the public key of a provider of a corresponding data-carrier application.

Such a certificate can be constructed, for example, according to the X.509-standard of the International Telecommunication Union (ITU). The end-device application certificate is preferably such an X.509-certificate, so that the update data are integrated or written into an extension field ("extensions") provided according to the X.509-standard. However, any other certificate data structure that permits an integration of such extensions is suitable within the framework of the present invention.

The present invention makes possible a technically simple and secure update of installed data-carrier applications, in particular of access rights of end-device applications to such data-carrier applications, on the one hand, and a simple and secure installation of new data-carrier applications with corresponding access rights by end-device applications, on the other hand. The updating or installing of data-carrier applications does not affect the confidence that a user has in the security of the secure data carrier, because he can comprehend and check the changes with respect to data. Thus, an update of a data-carrier application for example must be actively intended and initiated by the user by downloading and installing the relevant end-device application onto his telecommunication end device, which entails a considerable gain of confidence and further security advantages compared to the automatic update via an air interface.

Moreover, a telecommunication connection, involving security problems, to an external update server is not necessary. The data carrier therefore needs no software or hardware facilities beyond the usual infrastructure. It is equally not necessary to have a proxy application on the telecommunication end device for the mediation between an external update server and the data carrier.

Moreover, the invention can be implemented without a change of the technical infrastructure, because the update data are made available by way of a container data structure—of the end-device application certificate—brought into the telecommunication end device anyway, and this within the framework of the procedure of installing an end-device application, which procedure is usual and known on telecommunication end devices. This means in particular, that all the data required for the update or installation can be completely brought into the end-device application certificate as a container data structure, and thus no further method steps, such as e.g. additional loading or installation steps, are necessary.

Preferably, the update data are made available by the provider of that data-carrier application whose update the update data relate to, and are also integrated into the end-device application certificate by this provider. For the checkable authorization of the update, the provider of the data-carrier application signs the end-device application certificate—together with the update data integrated therein—with his secret key. The signature of the end-device application certificate can then supplement the end-device application certificate, which preferably corresponds to the X.509-standard, in such a way that also the signed X.509-end-device application certificate in turn corresponds to the X.509-standard. For example, the signature can be made available in a signature field of the X.509-certificate especially provided for the signature deposition.

This creates an effective control mechanism, which prevents a not authorized (e.g. manipulative or damaging) update of the data-carrier application or the bringing in of other malicious code into the data carrier, because with the signature it is checkable at any time, whether the provider of the relevant data-carrier application has approved the update thereof.

The signature of the end-device application certificate—and thus the authorization of the update data—is verified before the data-carrier application is configured according to the update data. Updates not authorized by the provider of the data-carrier application are therefore not possible. The verification can either be carried out on the level of the telecommunication end device, e.g. by a programming interface (API—application programming interface) to the data carrier, which API is installed on the telecommunication end device, or directly on the level of the data carrier, e.g. by a facility accordingly adapted and secured, such as the security application of the data carrier discussed below. The verification on the data carrier is preferred, however, because the data carrier in principle fulfills higher security requirements than the telecommunication end device, which normally is not especially secured.

The signature of the end-device application certificate—which was created with the secret key of the provider of the data-carrier application—is verified with a public key of this provider. For this purpose, the public key of the provider of the data-carrier application of the security application is present on the data carrier or the programming interface on the telecommunication end device.

Integrating the update data into the end-device application certificate is effected by the provider of the data-carrier application in such a way that the update data are transparent to the telecommunication end device or its operating system and run-capable applications—i.e. the update data remain unaffected by the telecommunication end device and leave the telecommunication end device unaffected—and are passed through to the data carrier without effects, for example via the programming interface installed on the telecommunication end device. In connection with an X.509-end-device application certificate this can be achieved for example in that the update data being entered in an extension field, which upon the actual employment of the end-device application certificate goes unheeded as a trustworthy carrier of the public key of the provider of the end-device application.

The transparency of the update data to the telecommunication end device applies in particular with the installation of the end-device application on the telecommunication end device by an installation facility ("package installer") of the telecommunication end device or the operating system thereof. In so doing, a signature of the end-device application is verified by the provider thereof with the public key of the provider of the end-device application, which key is present in the end-device application certificate.

Preferably, the update data are also transparent to the programming interface, because the latter merely extracts the update data intended for the data carrier from the end-device application certificate without being capable of interpreting or processing them and passes them on to the security application of the data carrier. On the level of the data carrier the actual configuration of the data-carrier application is then carried out on the basis of the update data.

The update data thus do not affect the installation facility or the programming interface, nor are they affected by these facilities. This transparency substantially constitutes the data-container property of the end-device application certificate that is exploited according to the invention. In an X.509-end-device application certificate this transparency is ensured by the update data being brought into an extension field, whose content is meaningless and transparent to the telecommunication end device or the operating system thereof.

The security application already mentioned several times and installed on the data carrier (e.g. in the form of a "security applet") manages a certificate list and an access right list. The certificate list comprises data-carrier application certificates of the data-carrier applications installed in the data carrier, i.e. certificates which make available in a trustworthy manner a public key of the provider of the relevant data-carrier application.

The security application thus has all the public keys of data-carrier application providers, which, where applicable, must be employed in order to verify the signature (generated by a provider of an installed data-carrier application) of an end-device application certificate with integrated update data, the end-device application of which requires access to just this data-carrier application. The access right list comprises the access rights or access conditions of the end-device application installed in the telecommunication end device to the data-carrier applications installed in the data carrier. Preferably, the access right list is divided into respectively one access right list for each data-carrier application installed in the data carrier. For a simple check of access rights, each data-carrier application certificate in the certificate list is connected with the respectively assigned access right list preferably via a data-carrier application identification that uniquely references the relevant data-carrier application.

By means of this data infrastructure, upon a conventional access of an end-device application already installed on the telecommunication end device to a data-carrier application already installed in the data carrier, preferably the security application or, where applicable, also the programming interface can check whether the access right list provides corresponding rights for such an access.

In case of an end-device application that is to be newly installed, however, the respective access right list first has to be supplemented with the new access rights, i.e. the relevant data-carrier application must be updated. In this embodiment of the invention the data-carrier application is configured in that the access right list that is allocated to this data-carrier application in the security application is supplemented by new access rights comprised by the update data.

The public key of the provider of the data-carrier application required for verifying the signature of the end-device application certificate is in this embodiment already deposited in the security application or in the certificate list, because the relevant data-carrier application is already installed and the data-carrier application certificate thereof, with the public key of the provider of the data-carrier application, is thus registered in the certificate list. The signature of the end-device application certificate can thus be verified with the public key of the provider of the data-carrier application, which key is deposited in the data-carrier application certificate thereof in the certificate list.

Starting point of a modified or extended embodiment of the invention is that the data-carrier application, to which the end-device application to be installed requires access, is not yet installed in the data carrier. The update data of the end-device application certificate thus relate in this embodiment to a data-carrier application to be newly installed in the data carrier and accordingly also comprise an installable version of the data-carrier application itself, e.g. the byte code thereof.

The data-carrier application in this embodiment is therefore configured in that it is installed in the data carrier and the corresponding changes are made in the certificate list and the access right list, in order for the end-device application to be granted access to the newly installed data-carrier application.

For this purpose, the update data, after the successful check of the signature of the end-device application certificate, are extracted from the end-device application certificate by the programming interface and passed on to the security application on the data carrier for the configuration of the data-carrier application. Besides the installation of the data-carrier application, the configuration thereof comprises in this embodiment also that the security application enters the relevant data-carrier application certificate into the certificate list. Likewise, as already explained above, the required access rights of the end-device application are extracted from the end-device application certificate and entered into the relevant access right list.

The public key of the provider of the data-carrier application, which is required for checking the signature of the end-device application certificate—and thus for checking the authorisation of the update data by the provider of the data-carrier application—now, however, cannot be taken from a data-carrier application certificate already registered in the certificate list (since the relevant data-carrier application is not yet installed). Instead, the update data integrated in the end-device application certificate comprise here also the data-carrier application certificate with the public key of the provider of the data-carrier application. The security application of the data carrier can thus verify the signature of the end-device application certificate by means of the public key of the provider of the data-carrier application, as soon as the data-carrier application certificate has been extracted from the update data.

According to a special embodiment variant of this embodiment, one can do completely without the access rights, however. Here, the provider can adjust the data-carrier application yet to be installed so exactly to the relevant end-device application, that upon the access of the end-device application no particular access rights are needed, e.g. because the data-carrier application possesses a range of functions that is only very restricted and exactly adjusted to the end-device application. In this embodiment variant the providers of data-carrier applications thus would no longer make available complete data-carrier applications with an extensive range of functions, but merely reduced versions of such data-carrier applications that are exactly adjusted to the individual end-device applications. Here, an advantage would be that the administrative effort in view of the access rights would be reduced with respect to some or even all the end-device applications or would even be completely omitted.

After the security application having obtained the extracted update data from the programming interface, it performs the necessary updates of the certificate list and access right list and prepares the data-carrier application for the installation in the data carrier. This installation preparation may comprise e.g. decoding and cryptographic operations, e.g. the decryption of the byte code of the data-carrier application, if this was integrated, for security reasons, in encrypted fashion in the end-device application certificate by the provider of the data-carrier application. In such an end-to-end encryption between the provider of the data-carrier application and the security application, the necessary, e.g. secret symmetric, keys are preferably available only to these two entities. Subsequently, the prepared, installable version of the data-carrier application is transferred to an installation facility of the data carrier, e.g. a data carrier management responsible therefor, and installed by this.

If the operating system of the data carrier is set up according to the "GlobalPlatform" standard, the installation of the new data-carrier application is taken on by a so-called "card manager", which represents the central data carrier management of the data carrier. Here, the programming interface running on the telecommunication end device takes over an mediator or "proxy" function between the security application and the "card manager", by the data-carrier application to be installed being first passed on from the security application to the programming interface with an installation instruction against the data carrier management and the programming interface subsequently transmitting the data-carrier application to be installed to the data carrier management, likewise with a corresponding installation instruction. There, the installable version of the data-carrier application is finally installed. As the data-carrier application, when the programming interface is employed as a "proxy", temporarily leaves the secure environment of the data carrier, a further (or accordingly extended) end-to-end encryption between the security application and the data carrier management can be provided.

Within the framework of the above-described embodiments it is of course also possible that an end-device application certificate comprises update data for several data-carrier applications—where applicable, of different providers—, e.g. at least for one already installed data-carrier application and for at least one data-carrier application to be newly installed. For this purpose, the end-device application certificate must be signed by each individual involved provider of data-carrier applications, so that several signatures are present and must be verified. The security application then configures each of these data-carrier applications according to the specifications of the assigned update data.

A secure data carrier according to the invention is not restricted to only mobile radio cards, e.g. (U)SIM-mobile radio cards or the like, but can also be a digital memory card adapted according to the invention and in particular equipped with a security application, for example a microSD card, secure multimedia card or the like. The secure data carrier according to the invention in particular comprises its own processor and its own run-capable applications. The data carrier is for example in particular a data carrier insertable into the telecommunication end device and removable from the telecommunication end device. Alternatively, the data carrier is a data carrier that is adapted for firm implementation in a telecommunication end device, e.g. an Embedded Secure Element or Embedded Smart Card Chip for firm implementation into a telecommunication end device, and is inserted firmly implemented into a telecommunication end device e.g. by the end-device manufacturer, so that it is not (or at least not without destruction) removable from the end device by a user, in particular a NFC chip for a NFC-capable telecommunication end device. The operating system of the data carrier is preferably based on Java or Java Card and can be designed according to the GlobalPlatform standard. The data-carrier applications as well as the security application are preferably so-called applets or Java applets or the like.

A telecommunication end device according to the invention is adapted as described above and comprises in particular a programming interface, via which the data carrier can be accessed in standardized fashion. It is preferably a smartphone with Android operating system and so-called Android "apps" that are run-capable thereon. Moreover, the telecommunication end device can also be another possibly portable computer end device, e.g. a personal digital assistant (PDA), a portable computer, a tablet PC or the like, into which a secure data carrier can be inserted for making available a telecommunication or mobile radio connection and/or secured memory space. The invention is not restricted to the Android operating system, however, but can be realized in principle on each suitable smartphone or computer operating system.

BRIEF DESCRIPTION OF THE DRAWINGS

Further features and advantages of the invention will arise from the following description of embodiment examples according to the invention, as well as further alternative embodiments, in connection with the attached drawings which show:

FIG. 1 a schematic process flow of two preferred embodiments of the invention;

FIG. 5 an example of an end-device application certificate with update data.

DETAILED DESCRIPTION OF VARIOUS EMBODIMENTS

FIG. 1 shows the process flow of the method according to the invention for updating a data carrier by updating or installing a data-carrier application 110 executable on a secure data carrier 400 with subsequent configuration of the data-carrier application 110. Here, the method steps S1 to S11 correspond to a first preferred embodiment of the invention that relates to the update of a data-carrier application 110 already installed in step S1, while the step succession S2 to S9, S10a to S10e, S11 corresponds to a second preferred embodiment of the invention that relates to the installation of a new data-carrier application 110 in step S10a. The two embodiments are no alternatives, but can be jointly used and implemented.

Figure 2:
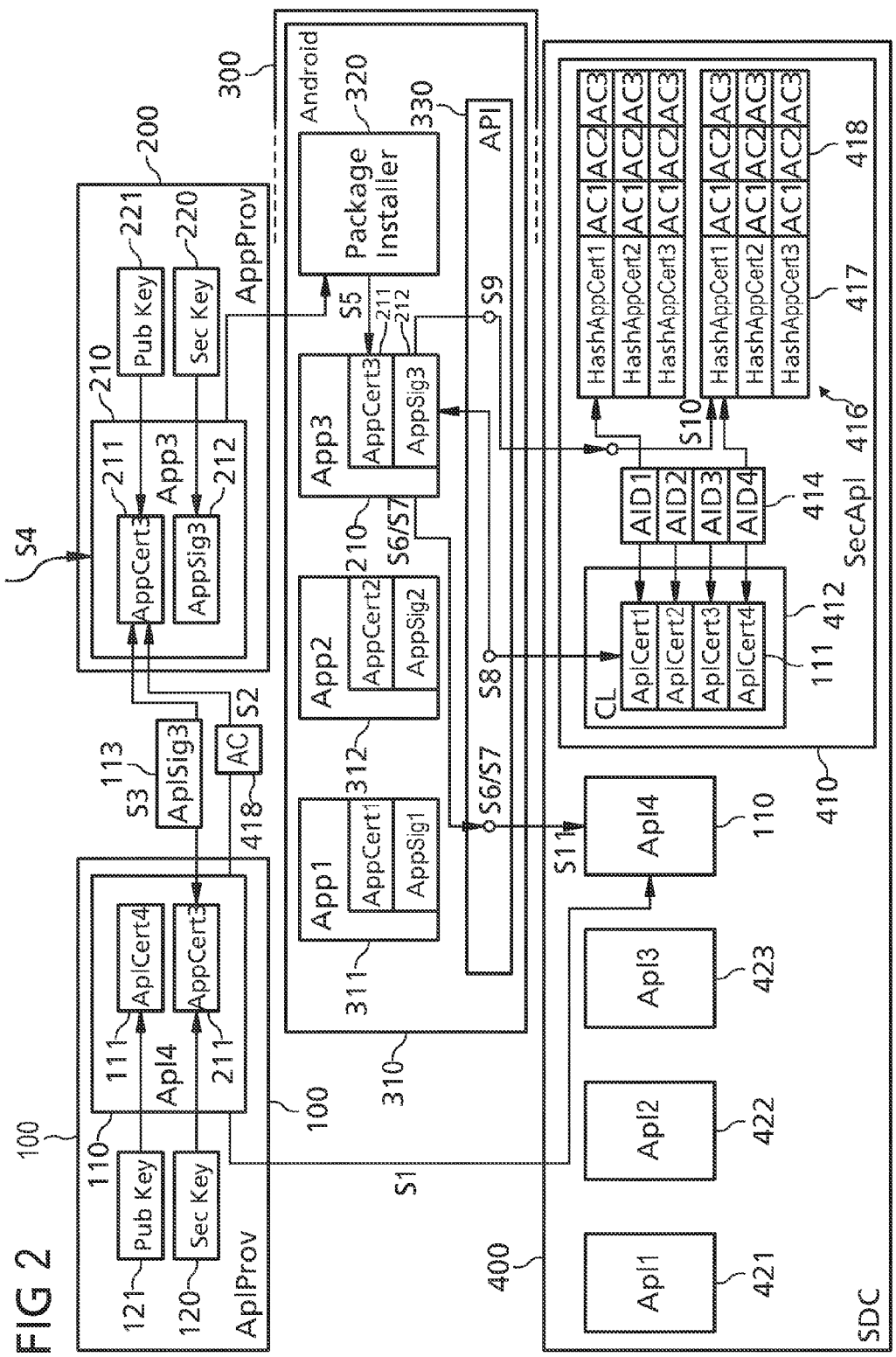
FIG. 2 a schematic overview of the facilities employed in a first embodiment according to FIG. 1.

In the following, the first embodiment is explained in connection with the FIGS. 2 and 4a and the second embodiment in connection with the FIGS. 3 and 4b. Both embodiments, however, relate to a telecommunication end device in the form of a modern smartphone 300, on which the minicomputer operating system "Android" 310 of the Google company is installed. Of course, the invention is also expediently usable in and implementable on other computer formats with other operating systems, e.g. on personal digital assistants (PDA), laptops, notebooks, tablet PCs and other portable minicomputers, which often also make available telecommunication or mobile radio functionalities.

The diverse end-device applications that are run-capable on the Android smartphone 300 accordingly are so-called "apps" 210, 311, 312 (App3, App1, App2), i.e. applications especially adjusted to the resources, areas of use, and uses of smartphones 300, which apps can e.g. be downloaded from the Android Marketplace and installed on the smartphone 300. In addition to the Android operating system 310 with the Android apps 210, 311, 312 running on them, there also exist still further smartphone operating systems with specialized smartphone applications, on which the present invention can also be implemented. But Android due to its open source concept is very well suitable for the following exemplary explanation of the invention.

Involved in the method is, in addition to the smartphone 300, a secure digital data carrier in the form of an SD-card 400 (SDC) that when inserted in a slot of the smartphone 300 provided therefor represents a secure memory or a secure memory extension of the smartphone 300. The SD-card 400 preferably comprises a Java-based operating system, e.g. Java Card or the like, so that the data-carrier applications 110, 421, 422, 423 (Apl4, Apl1, Apl2, Apl3) installed on the SD-card 400 are applets or Java applets. Of course, as secure data carriers 400 according to the present invention also other data carriers having processor and further computing resources usable in a smartphone 300 are suitable, for example (U)SIM-mobile radio cards, microSD cards, secure multimedia cards and the like. Also, these data carriers can be equipped with arbitrary smart-card or memory-card operating systems and applications run-capable on these.

A special applet installed on the SD-card 400 is the so-called security applet 410 (SecApl), which in connection with the access of an app 210 to an applet 110 and with the update of an applet 110 assumes security and control functions. In this respect, the terminating configuration of an applet 110 according to the invention is carried out or at least initiated by the security applet 410.

The security applet 410 manages a security structure comprising a certificate list 412 (CL), in which various data-carrier application certificates in the form of applet certificates 111 (AplCert1 to AplCert4) are stored. Further, the security applet 410 also manages one or several access rights lists 416, which are assigned via an applet identification 414 (AID1 to AID4) to the certificates 111 of the certificate list 412. The access rights lists 416 in turn specifies app identifications 417 (HashAppCert1 to HashAppCert3), which respectively address a list 416 of access rights 418 (AC1, AC2, AC3, "access condition") that state the access rights 418 of the app 210 designated by the app ID 417 to that applet 110 whose applet-ID 414 refers to the relevant access right list 416.

If an app 210 must access an applet 110, the security applet 410 can check via the respective applet-ID 414, whether the relevant app 210 possesses the necessary access rights 418. The access rights 418 assigned to the app 210 via the access right list 416 are identified by the app ID 417, which corresponds to a hash value of the app certificate 211, which is newly formed with each check of the access rights 418.

In the case that an app 210 requires access to an applet 110 whose access rights 418 does not allow this or which is not yet installed as an applet 110 in the SD-card 400, a corresponding update of the applet 110 can be effected (i.e. a configuration of the applet 110 by an update of the access rights 418 between the applet 110 and other applets and/or the installation of the applet 110) by the update data required for this being brought according to the method of FIG. 1 into an end-device application certificate in the form of an app certificate 211 (AppCert3) and passed on, transparent to the Android operating system 310, to the security applet 410 on the SD-card 400, so that a configuration of the applet 110 corresponding to the update data can be effected there.

According to a first embodiment, the update of the access rights 418 of an applet Apl4 110 is performed as follows: In a step S1 ("install Apl4") first the applet Apl4 110 is installed on the SD-card 400 by the applet provider 100 (AplProv) or at least at the applet provider's prompting, for example within the framework of a manufacturing process of the SD-card 400, e.g. upon the initialization or personalization thereof. In so doing, also the access rights 418 of various apps 311, 312 (App1, App2) to this applet 110 (Apl4), which are known at this time, are deposited in the security applet 410 of the SD-card 400.

The steps S2 to S11 then relate to the configuration of the applet 110 with respect to later updating the access rights 418 of the app 210 (App3) to be newly installed to the already installed applet 110 (Apl4). For this purpose, in the smartphone 300 there is installed, preferably as a supplement or extension of the Android operating system 310, a programming interface 330 (API) for standardized access to the SD-card 400. The API 330 cooperates with the security applet 410, in order to implement a secure procedure for later updating the applet 110.

The starting point of this update is the app certificate 211, which is part of the installation package of the app 210 to be newly installed and is issued by a trustworthy entity for the public key 221 of the app provider 200 (AppProv) of the app 210. In addition to the app certificate 211 also the signature 212 (AppSig3) of the app 210 exists in the installation package of the app 210, with which the app provider 200 guarantees with the aid of his secret key 220 the authenticity of the app 210.

In case of already installed applets 421, 422, 423 (Apl1, Apl2, Apl3) the API 330 can check, in cooperation with the security applet 410, the access rights 418 of an app 311, 312 accessing an applet 421, 422, 423.

In step S2 ("write UpdtDat"), the applet provider 100 integrates the update data in the form of access rights 418 into the app certificate 211, in order to give the security applet 410 in this way the access rights 418 made available by the applet provider 100 and required by the app 210, for the corresponding configuration of the applet 110.

In step S3 ("sign AppCert3") the provider 100 of the applet 110 to be updated issues with the aid of his secret key 120 a signature 113 (AplSig3) of the app certificate 211 supplemented by the update data, which is connected with the app 210 e.g. by the signature 113 being brought into an installation package of the app 210.

Figure 4A:
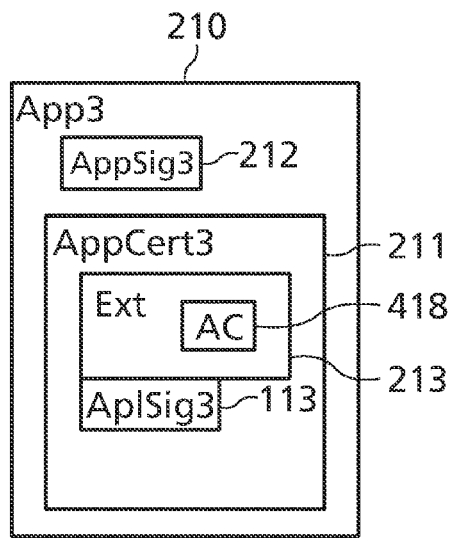
FIG. 4 a schematic overview of end-device application certificates according to preferred embodiments of the invention.

FIG. 4a shows the essential contents of such an installation package of the app App3 210 comprising the signature 212 of the app provider 200, the app certificate 211, and the signature 113 of the applet provider 100. The present embodiment example is an app certificate 211 according to the X.509-certificate format, so that the update data in the form of access rights 418 can be entered into the extension fields 213 (Ext) specified according to the X.509-standard. These extension fields specified according to the X.509-standard can take up further data, which do not have to be in a connection with the actual function of the certificate 211, namely making available a public key 221 in a trustworthy manner. An example for an app certificate 211 according to the X.509-standard with extension data ("extension") integrated therein is shown in FIG. 5.

The mechanism of the extension fields 213 is used in order to bring the update data in such a way into the app certificate 211 that they are transparent to the smartphone 300 and its functions and software components—possibly with the exception of the API 330, which is a programming interface of the SD-card 400. The app certificate 211 thus represents a container data format that in the extension fields 213 can transport data in transparent manner from outside the smartphone 300, e.g. from the applet provider 100, through the smartphone 300 up into the SD-card 400 or the security applet 410 thereof. The update data stored in the extension fields 213 of the app certificate 211 are left out of consideration by the smartphone 300.

Figure 4B:
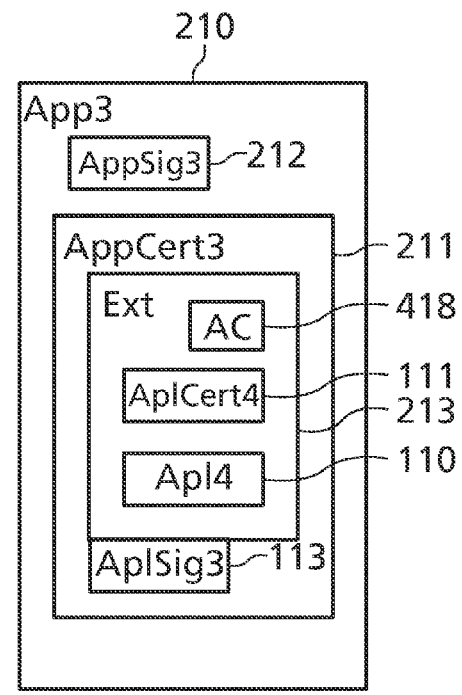

The signature 113 of the applet provider 100 is a cipher of the app certificate 211 encrypted with the secret key 120 of the applet provider 100 and can be present separately in the installation package of the app 210 (cf. FIG. 4). The signature 113 can be brought into the signature field for example according to the X.509-standard. In the extension fields 213 the app certificate 211 can take up (still further) information items of the applet provider 100, which relate to the applet 110, for example the applet-certificate 111 with the public key 121 of the applet provider 100 or the byte code of the entire applet 110, as it is the subject matter of the second embodiment of the invention (cf. FIG. 4b). Likewise, the unique app ID 417 can also be present as an extension 213 in the app certificate 211.

The thus equipped app 210 is then offered by the applet provider 100 in the step S4 ("deploy App3") at a public app market, for example at so-called "Google Marketplace", to potential users for installation on their smartphones. The app 210 is downloaded from there in the step S5 ("install App3") and installed under the Android operating system 310 in the smartphone 300.

As the app 210 offered in the "Marketplace" or another public platform carries the signature 113 of the applet provider 100, which is formed over the entire app certificate 211 together with the access rights 418, the signature 113 constitutes an authorization, by the applet provider 100, for the app 210 to access the applet 110.

In step S5, the app 210 is installed under the Android operating system 310 by means of a special installation routine 320 ("package installer") by the installation routine 320 first checking the signature 212 of the app provider 200. For this purpose, the signature 212 is decrypted with the public key 221 of the app provider 200 and compared with the signed plain text of the app 210. The installation routine 320 obtains the public key 221 from the app certificate 211 attached to the app 210, which guarantees the trustworthiness of the public key 221.

In step S6 ("start App3"), the installed app 210 is started by a user of the smartphone 300 and said app then attempts in a step S7 ("access Apl4") to access the applet Apl4 110. For this, however, the app App3 210 has not yet any access rights 418 in the access right list 416 of the security applet 410. The required access rights 418 have hitherto been present only in the app certificate 211.

Subsequently, in the step S8 ("verify AppCert3") the app certificate 211 is verified by the API 330 by the signature 113 being decrypted with the public key 121 of the applet provider 100 and being compared with the plain text of the app certificate 211. Deviating therefrom, the verification of the app certificate 211 and the subsequent update of the access right list 416 can also be effected directly after or even upon the installation of the app 210 in step S5. In a preferred implementation variant, the verification of the step S8 can be performed by the security applet 410 also in the secure environment of the SD-card 400. In this case, the app certificate 211 is passed through to the security applet 410 by the programming interface 330.

Upon the verification of the signature 113 the API 330 (or the security application 410) obtains the public key 121 of the applet provider 100 from the certificate list 412 in which the applet-certificate 111 was deposited upon the installation of the applet 110 in the SD-card 400 carried out in step S1. If the verification of the signature 113 is successful, the update data stated in the extension field 213 of the app certificate 211, i.e. at least the access rights 418, are extracted by the API 330 and in step S9 ("transmit UpdtDat to SecApl") transmitted to the security applet 410 for the configuration of the applet 110. If the verification in step S8 is carried out by the security applet 410, in case of a successful verification this notifies the API 330 to the effect that the update data 418 can be extracted from the app certificate 211. Alternatively, also the security applet 410 can extract the update data 418 from the app certificate 211. During or after the extraction of the update data 418 the integrity thereof does not have to be checked, however, because this was already checked through the verification of the signature 113 of the applet provider 100 in step S8.

In the step S10 ("update CL") the security applet 410 finally configures the applet 110 by the access right list 416 being updated with the update data in the form of the access rights 418 of the app 210 to the applet 110. For this purpose, the relevant access right list 416 is ascertained via the applet-ID 414. Thereafter, the app ID 417 is formed in the form of an SHA-1-hash value of the app certificate 211 and compared with the app IDs 417 already registered in the access right list 416 or newly entered therein with the corresponding access rights 418. Upon a later access of the app 210 to the applet 110, the security applet 410 can check via the applet-ID 414 and the app ID 417 at any time whether the required access rights 418 are present. Finally, in step S11 ("grant access"), the security application 410 grants the app 210 access to the applet 110.

Figure 3:
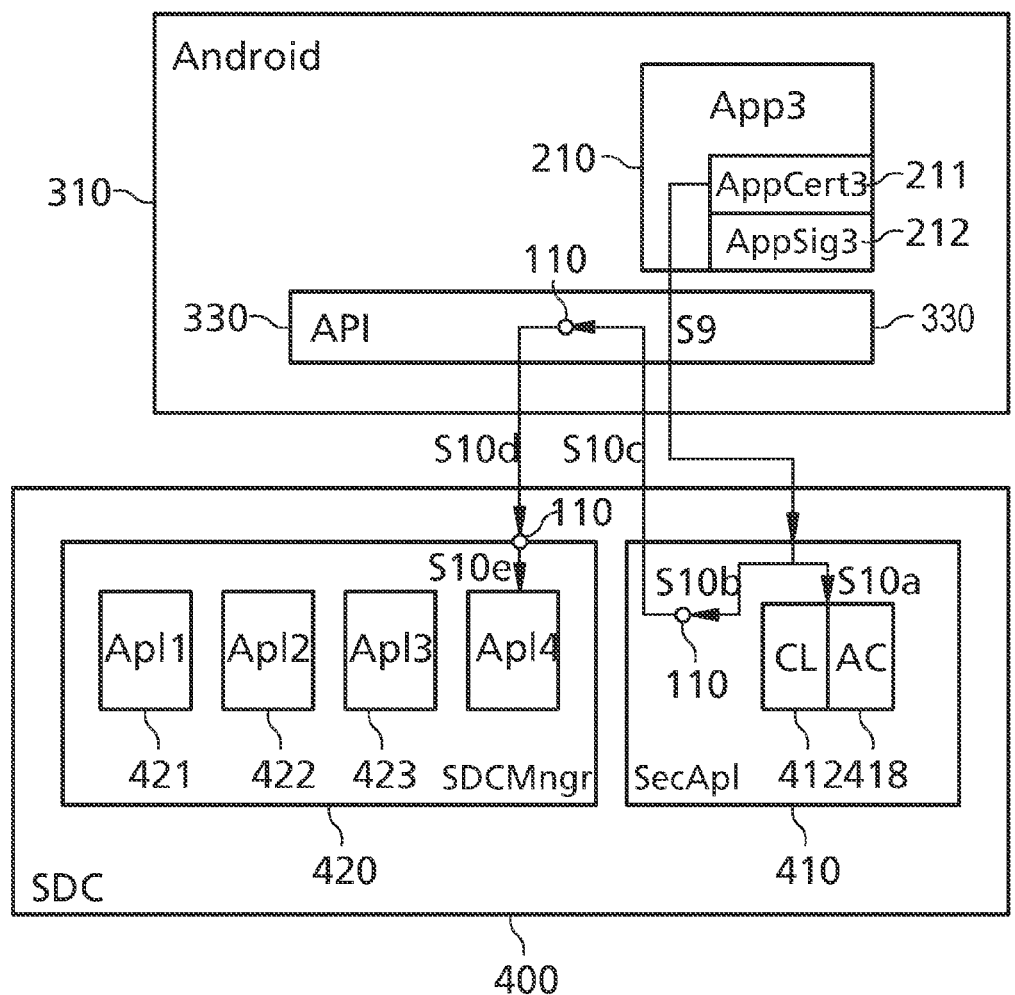
FIG. 3 a schematic overview of the facilities employed in a second embodiment according to FIG. 1.

In a second embodiment of the invention in connection with the FIGS. 3 and 4b, to the security applet 410 there is made available an applet 110 hitherto not installed on the SD-card 400 by means of the container data structure of the app certificate 211. The configuration of the applet 110 comprises in this embodiment the installation of the applet 110 on the SD-card 400 and the setting up of the corresponding access rights 418. The further procedure of this embodiment arises from the sequence of the steps S2 to S9, S10a to S10e and S11 of the FIG. 1 by an interaction, comparable with the first embodiment, between the API 330 on the smartphone 300 and the security applet 410 on the SD-card 400.

The step S1 of early installation of the applet 110, of course, is omitted here, because it is precisely the subject matter of this embodiment to install the applet 110 later. Furthermore, in this embodiment the configuration step S10 is omitted; rather, the applet 110 is configured and installed by means of the steps S10a to S10e.

In step S2, the applet provider 100 does not only integrate access rights 418 of the app 210 to the applet 110 into the app certificate 211, as described in connection with the first embodiment, but also the applet 110 itself, or its byte code, as well as the applet-certificate 111 with the public key 121 of the applet provider 100. In step S3, the applet provider 100 signs the app certificate 211 having the entire update data with his secret key 120 and forms the signature 113. In this embodiment, the installation package of the app 210 comprises in addition to the signatures 212 and 113 an app certificate 211 according to FIG. 4b, comprising extension fields 213 according to the X.509-standard with access rights 418, the byte code of the applet 110 to be installed, and the applet-certificate 111.

Thus, after the step S4 there is located at the "Marketplace" or on another public download platform an app 210 which also comprises in the form of a data container an applet 110 to be installed on the SD card 400, authorized by the applet provider 100 by means of the signature 113 over the total app certificate 211.

In order to ensure the integrity of the update data in the extension 213, in particular of the byte code of the applet 110, an end-to-end encryption between the applet provider 100 and the SD-card 400 or the security applet 410 thereof is provided. This can be realized for example by a symmetric AES-encryption, the joint secret key only being available to the applet provider 100 and the security applet 410.

The further course of the steps S5 to S8 is then analogous to that of the first embodiment. The only important point here is that in the step S8 the app certificate 211 and its extensions 213 are checked, by the signature 113 being verified with the public key 121 of the applet provider 100 whose applet-certificate 111 is not (yet) present in the certificate list 412 but in an extension field 213 of the app certificate 211. The verification step S8 is preferably carried out by the security applet 410, so that the verification can take place in the secured environment of the SD-card 400.

After successful verification of the signature 113 of the applet provider 100, the API 330 extracts in step S9 the update data (i.e. the access rights 418, the applet 110, and the applet-certificate 111) from the app certificate 211 and passes them on to the security applet 410. As in the first embodiment, the update data can also be extracted directly by the security applet 410, however.

Comparable with the step S10, then in step S10a ("update CL, AC") the access rights 418 are deposited in the corresponding access right list 416—identified by the hash value of the app certificate 211 as app ID 417. In so doing, then also the applet-ID 414 is deposited in the security applet 410, and the applet-certificate 111 with the public key 121 of the applet provider 100 extracted from the extension 213 of the app certificate 211 is deposited in the certificate list 412. There is thus created a completely new access right list 416 starting out from the applet-ID 414, in which list, addressed by the app ID 417 in the form of a hash value of the app certificate 211, the new access rights 418 of the app 210 to the applet 110 are deposited.

In step S10b ("decode Apl4 from UpdtDat"), the extracted byte code of the applet 110, which is present at the security applet 410 still in the form as encrypted or encoded by the applet provider 100, is decoded and/or decrypted in the secure environment of the security applet 410. In step S10b, also all the further necessary operations for the preparation of the installation of the applet 110 are carried out.

Preferably, however, the byte code of the applet 110 is then installed not directly by the security applet 410. According to the GlobalPlatform standard, which at least in the future will be relevant in the smartphone area (cf. www.globalplatform.org), such a direct installation is not provided. Instead, the installation of an applet 110 is to be performed via the smartphone 300 or the API 330 thereof. Thus, the API 330 acts in the remaining steps S10c to S10e as an mediator or proxy unit between the security applet 410 and the "card manager" 420 (SDCMngr) of the SD-card 400, which represents the central management unit of the SD-card 400 and as such is responsible for the installation of new applets 110.

So as to guarantee the data integrity of the byte code of the applet 110, in step S10b there can be carried out a further encryption of the applet 110, as the applet 110 leaves the secure environment of the security applet 410 and is made available to the card manager 420 via the potentially insecure API 330. There is thus either provided a further end-to-end encryption between the security applet 410 and the card manager 420, or the byte code of the applet 110 is not yet decrypted in the security applet 410 in step S10b, but only in the step S10e in the card manager 420 within the framework of the installation of the applet 110. In the latter case, there exists an end-to-end encryption between the applet provider 100 and the card manager 420, the necessary keys being securely kept in the SD-card 400 or in the security applet 410 and/or in the card manager 420.

In the steps S10c and S10d, the applet 110 is then transferred, according to the GlobalPlatform standard, from the security applet 410 to the API 330 and by this passed on to the card manager 420 for the ultimate installation. The API 330 thus acts vis-à-vis the card manager 420 as a host unit, which for its part receives the data to be made available, namely the applet 110, from the security applet 410 of the SD-card 400.

The invention claimed is:

1. A method for updating a data carrier inserted in a telecommunication end device, comprising updating or installing a data-carrier application executable on a secure data carrier, comprising the steps of:
    integrating update data for the data-carrier application into an end-device application certificate of an end-device application to be installed in the end device, such that the update data is stored in the end-device application certificate upon installation of the end-device application;
    installing the end-device application in the telecommunication end device and extracting the update data from the end-device application certificate; and
    configuring the data-carrier application according to the extracted update data, wherein a programming interface of the data carrier installed on the telecommunication end device or by the data carrier itself, extracts the update data from the end-device application certificate and passes the update data on to the security application.

2. The method according to claim 1, wherein a provider of the data-carrier application integrates the update data into the end-device application certificate and signs the end-device application certificate with a secret key.

3. The method according to claim 2, wherein a signature of the end-device application certificate is verified by a programming interface of the data carrier installed on the telecommunication end device or by the data carrier itself, before the data-carrier application is configured according to the update data.

4. The method according to claim 1, wherein the update data are integrated into the end-device application certificate in such a way that they can be passed on to the data carrier in transparent manner.

5. The method according to claim 1, further comprising a security application updating a certificate list and at least one access right list according to the update data, the security application being installed in the data carrier and updates the certificate and the at least one access right list upon configuring the data carrier application,
    wherein the certificate list comprises data-carrier application certificates of data-carrier applications installed in the data carrier and the at least one access right list states access rights of end-device applications installed in the telecommunication end device to data-carrier applications installed in the data carrier.

6. The method according to claim 5, wherein the programming interface, upon installing the data-carrier application, receives the data-carrier application from the security application and installs it in a data carrier management of the data carrier.

7. The method according to claim 5, checking whether corresponding access rights of the end device application are entered in the at least one access right list,
    wherein the step of checking is performed by a programming interface of the data carrier installed on the telecommunication end device or by the data carrier itself, or the security application, upon an access of an end-device application installed on the telecommunication end device to a data-carrier application installed in the data carrier.

8. The method according to claim 5, integrating the update data into the end-device application certificate, wherein the update data relate to access tights of the end-device application to a data-carrier application installed in the data carrier, and the data-carrier application is configured by the access tights being deposited in such a way in the access fight list that the end-device application, upon an execution on the telecommunication end device, can access the data-carrier application.

9. The method according to claim 8, wherein a programming interface of the data carrier installed on the telecommunication end device or by the data carrier itself, verifies the signature of the end-device application certificate by means of a public key of the provider of the data-carrier application, which is deposited in the data-carrier application certificate of the data-carrier application comprised by the certificate list.

10. The method according to claim 5, wherein updated data arc integrated into the end-device application certificate, which relate to a data-carrier application to be installed in the data carrier, wherein the configuration of the data-carrier application comprises an installation of the data-carrier application in the data carrier.

11. The method according to claim 10, wherein the update data also relate to a data-carrier application certificate with a public key of the provider of the data-carrier application, and
the method further comprises verifying, by a programming interface of the data carrier installed on the telecommunication end device or by the data carrier itself, or the security application, the signature of the end-device application certificate by means of the public key of the provider of the data-carrier application and the security application enters the data carrier application certificate into the certificate list.

12. The method according to claim 10, wherein the update data also relate to access rights of the end-device application to the data-carrier application to be installed, wherein the security application enters the access rights into the access right list.

13. The method according to claim 1, wherein the update data are integrated according to the X.509-standard as extension data into an end-device application certificate.

14. A digital certificate constructed and adapted to be employed in accordance with a method as an end-device application certificate, comprising update data for updating or installing a data-carrier application executable on a secure data carrier;
wherein the method includes the steps of integrating the update data for the data-carrier application into an end-device application certificate of an end-device application to be installed in the end device, such that the update data is stored in the end-device application certificate upon installation of the end-device application;
installing the end-device application in the telecommunication end device and extracting the update data from the end-device application certificate; and
configuring the data-carrier application according to the update data;
wherein the data-carrier application is executable on a secure data carrier insertable or inserted in a telecommunication end device, the data carrier comprises data-carrier applications installed in the data carrier, and includes a security application installed in the data carrier, which is adapted to receive the update data from a telecommunication end device in which the data carrier is inserted and to update or to install a data-carrier application by the data-carrier application being configured according to the update data.

* * * * *